(12) United States Patent
Chen

(10) Patent No.: US 10,642,223 B2
(45) Date of Patent: May 5, 2020

(54) HOLOGRAPHIC DISPLAY DEVICE AND CONTROL METHOD THEREOF, COMPUTER NON-TRANSIENT READABLE STORAGE MEDIUM AND COMPUTER PROGRAM PRODUCT

(71) Applicant: BOE TECHNOLOGY GROUP CO., LTD., Beijing (CN)

(72) Inventor: Hao Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 144 days.

(21) Appl. No.: 15/906,780

(22) Filed: Feb. 27, 2018

(65) Prior Publication Data
US 2018/0246468 A1   Aug. 30, 2018

(30) Foreign Application Priority Data
Feb. 28, 2017  (CN) .................... 2017 2 0186184 U

(51) Int. Cl.
*G03H 1/22* (2006.01)
*G02B 27/09* (2006.01)
*G02B 7/02* (2006.01)
*G02F 1/29* (2006.01)
*G02B 5/32* (2006.01)
*G03H 1/02* (2006.01)

(52) U.S. Cl.
CPC ............. *G03H 1/2294* (2013.01); *G02B 5/32* (2013.01); *G02B 7/02* (2013.01); *G02B 27/0938* (2013.01); *G02F 1/292* (2013.01); *G03H 1/2205* (2013.01); *G03H 2001/0212* (2013.01); *G03H 2001/0224* (2013.01); *G03H 2001/2239* (2013.01); *G03H 2001/2292* (2013.01); *G03H 2225/10* (2013.01); *G03H 2225/12* (2013.01); *G03H 2225/25* (2013.01); *G03H 2226/05* (2013.01)

(58) Field of Classification Search
None
See application file for complete search history.

(56) References Cited

U.S. PATENT DOCUMENTS

| 2014/0036329 A1* | 2/2014 | Kang ................... G03H 1/2294 |
| | | 359/9 |
| 2016/0033935 A1* | 2/2016 | Seo ...................... G03H 1/2286 |
| | | 359/9 |

* cited by examiner

*Primary Examiner* — Jennifer D. Carruth
(74) *Attorney, Agent, or Firm* — McDermott Will & Emery LLP

(57) ABSTRACT

Embodiments of the present disclosure provide a holographic display device. The holographic display device includes a spatial light modulator and a light source unit. The light source unit is provided on the light entry side of the spatial light modulator and configured to providing read-out light to the spatial light modulator. The spatial light modulator includes at least one loading portion for receiving a write-in signal, which comprises a plurality of pixel units arranged in a matrix form, and the light exit surface of at least a part of which is a first cambered surface protruding in a direction away from the light source unit.

16 Claims, 4 Drawing Sheets

(Prior art)

HOLOGRAPHIC DISPLAY DEVICE AND CONTROL METHOD THEREOF, COMPUTER NON-TRANSIENT READABLE STORAGE MEDIUM AND COMPUTER PROGRAM PRODUCT

CROSS-REFERENCE TO RELATED APPLICATION

This application claims priority to Chinese Patent Application No. 201720186184.4, filed on Feb. 28, 2017, titled "HOLOGRAPHIC DISPLAY DEVICE", which is incorporated herein by reference in its entirety.

TECHNICAL FIELD

Embodiments of the present disclosure relate to display technology field, more particularly, to a holographic display device, a control method thereof, a computer non-transient readable storage medium and computer program product.

BACKGROUND

With the continuous development of display technology, 3D (Dimension) display technology is becoming increasingly popular and used. In the realization process of 3D display, the user's left eye and right eyes may receive different images, which can constitute a stereoscopic image pair with horizontal parallax, which may, through the fusion function of the brain, ultimately form a stereoscopic image with deep sense. However, because the images accepted by the user's left and right eyes are different, so the user is prone to be dizzy after watching the 3D display screen for a long time.

In order to solve the above-mentioned problems, a holographic display technique is proposed in the related art, so that the images received by the user's left and right eyes are consistent. The holography display technique is an image recording and reproduction technology which uses interference and diffraction principle to record and reproduce the real three-dimensional image of objects. The images reproduced using a holographic technology have a powerful stereo sense, with a real visual effect.

SUMMARY

In an aspect of the disclosure, an embodiment of the disclosure discloses a holographic display device, comprising a spatial light modulator and a light source unit provided on a light entry side of the spatial light modulator and configured to provide read-out light to the spatial light modulator, wherein, the spatial light modulator comprises at least one loading portion configured to receive a write-in signal, which comprises a plurality of pixel units arranged in a matrix form, and a light exit surface of at least a part of which is a first cambered surface protruding in a direction away from the light source unit.

Optionally, the holographic display device further comprises a collector configured to acquire an observation position, and a deflecting device, which is connected to the collector. The deflecting device is provided on a light exit side of the spatial light modulator, covers at least a part of the at least one loading portion, and is configured to deflect the output light of the part of the at least one loading portion covered by the deflecting device to the observation position.

Optionally, the deflecting device comprises at least one light deflecting element, and there is one-to-one correspondence between the at least one light deflecting element and the at least one loading portion.

Optionally, the at least light deflecting element comprises a liquid crystal grating.

Optionally, the deflecting device further comprises a bracket, and the light deflecting element comprises a convex lens, at least one deflection direction of which is adjustable, and which is movably mounted on the bracket.

Optionally, the at least one loading portion comprises at least two loading portions, the light exit surface of a part of the at least two loading portions is a second cambered surface protruding in a direction close to the light source unit, and the first cambered surface and the second cambered surface are located at different loading portions of the at least two loading portions.

Optionally, light exit surfaces of all of at least one loading portions of the spatial light modulator are the first cambered surface, and all of the at least one loading portion are connected end to end successively to form a ring.

Optionally, the light source unit is located within the ring in the spatial light modulator.

Optionally, the light source unit comprises a laser and a collimating beam expander disposed in turn on the light entry side of the spatial light modulator, the collimating beam expander being configured to convert the light emitted from the laser into a surface light source.

Optionally, the light source unit comprises at least one LED light source.

Optionally, the holographic display device further comprises: a controller connected to the spatial light modulator and configured to load holographic data of one frame of a hologram to the spatial light modulator. The light source unit comprises at least one light source, and there is one-to-one correspondence between the at least one light source and the at least one loading portion, and each of the at least one light source is connected to the controller which is configured to: in a situation that one or more loading portions of the at least one loading portion are addressed, open the light sources corresponding to positions of the one or more loading portions to be addressed in the light source unit, and close the remaining light sources in the light source unit.

In another aspect of the disclosure, an embodiment of the disclosure discloses a control method of controlling the holographic display device as above, wherein, the method comprises: acquiring user information which includes a current viewing position of a user; generating a deflection command based on the collected user information, the deflection command being configured to control a deflection angle of the deflection device in order to deflect output light so as to deflect a formed holographic image to the current observation position of the user.

Optionally, the step of generating a deflection command based on the collected user information includes: determining a user based on the user information, and generating the deflection command in a situation that the user meets a default condition.

Optionally, the user information comprises a facial feature of the user, and the default condition comprises at least one of a predetermined location and the user's age range.

Optionally, the method further comprises: determining one or more of the at least one loading portion of the spatial light modulator as current loading portions according to the current observation position of the user; opening only the light source corresponding to the current loading portions in the light source unit, so as to provide the read-out light for the current loading portions; making only the current loading portions in the spatial light modulator to receive a write-in signal.

In another aspect of the disclosure, an embodiment of the disclosure discloses a computer non-transient readable storage medium storing computer instructions configured to, when executed by a processor, cause the processor to perform the control method as above.

In another aspect of the disclosure, an embodiment of the disclosure discloses a computer program product comprising instructions that, when running on a computer, cause the computer to execute the control method as above.

BRIEF DESCRIPTION OF THE DRAWINGS

In order to describe technical solutions in embodiments of the present disclosure or in the prior art more clearly, the accompanying drawings to be used in the description of embodiments or the prior art will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
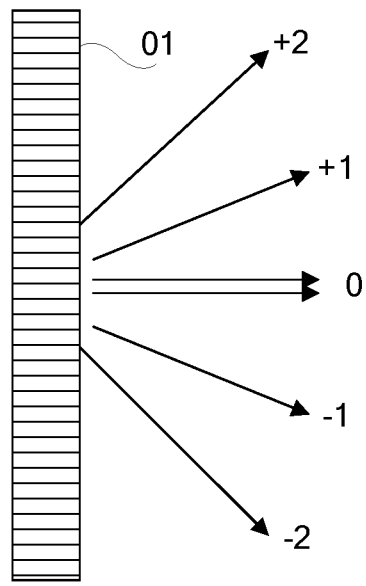
FIG. 1 is a schematic diagram of a multistage diffraction wave emitted by a holographic display device.

Optical holography is the use of principles of light interference and diffraction to carry out optical holography. In the holographic display technique, as shown in FIG. 1, the light emitted from the holographic display device 01 in related art includes a multi-stage diffraction wave, thereby forming a multi-stage diffraction pattern. The 0-order diffraction pattern therein is emitted to outside in the direction of the incident light and can only be viewed in the direction of the incident light, so the viewing range is small. For the diffraction pattern greater than or equal to the ±2 order, since the diffraction angle is too large, the light intensity is too small to view diffraction pattern. Thus, the holographic display device typically provides the viewer with ±1 order diffraction pattern, but the ±1 order diffraction patterns have a narrow viewing angle and are not easy for many people to watch.

Figure 2:
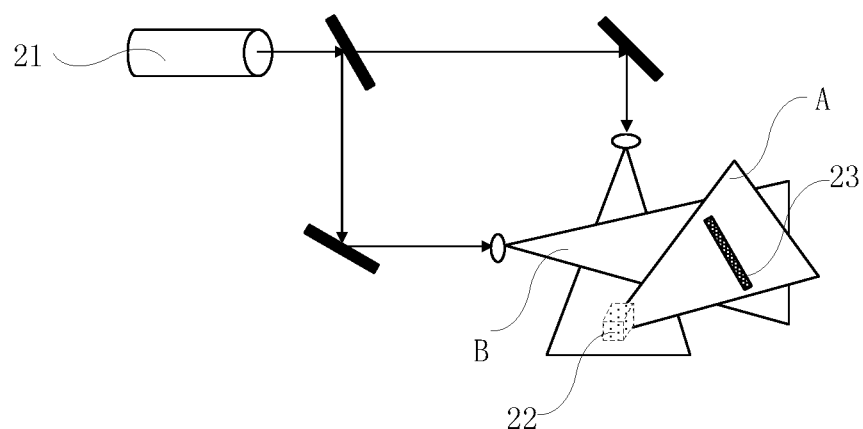
FIG. 2 is a schematic diagram of a holographic display principle provided by the related art.

In a holographic display device of the related art, as shown in FIG. 2, the light emitted from the laser 21 is divided into two beams. A beam of the two beams is irradiated onto the object 22, reflected and scattered on the surface of the object 22, and the reflected and scattered light forms an object wave A after reaching the holographic plate 23. The other beam of the two beams is coherent with the object wave A, and is irradiated to the holographic plate 23 as a reference wave B, so as to expose the holographic plate 23 in order that information of the phase and amplitude in the object wave A is recorded in the form of interference fringes on the Holographic plate 23. Then, based on light wave diffraction principle, the holographic plate 23 having the above-described interference fringes is irradiated with the light waves coherent with the object wave A, so that the original object wave A can be reproduced to form a 3D image of the object 22.

However, the holographic plate 23 in the related art is provided with a photosensitive material. Since the interference fringes recorded on the holographic plate 23 after exposure of the photosensitive material cannot be changed, it is difficult to realize dynamic display. So in order to achieve dynamic holographic display, the calculation of holographic (English full name: Computer Generated Hologram, referred to as: CGH) technology is used. In the technology, a mathematical description function of the object wave A is input directly into the computer to simulate the actual interference process, thus the interference fringes can be calculated, and according to the interference fringes a computer-generated hologram can be plotted.

Specifically, the process of obtaining the hologram described above may include: First, Sampling is made to obtain the value at discrete sample points of the object 22 or the wave surface;

Next, the light field distribution of the light wave A on the holographic plane is calculated;

Next, the coding is carried out, that is, the complex amplitude distribution of the light waves on the holographic plane is encoded as a change in transmittance of a hologram;

Finally, the hologram is plotted. Specifically, the transmittance changes of a hologram are plotted under computer control. In this step, if the resolution of the device for plotting is not enough, a larger image is plotted first and then the larger image is scaled down to gain the hologram to be used.

Figure 4:
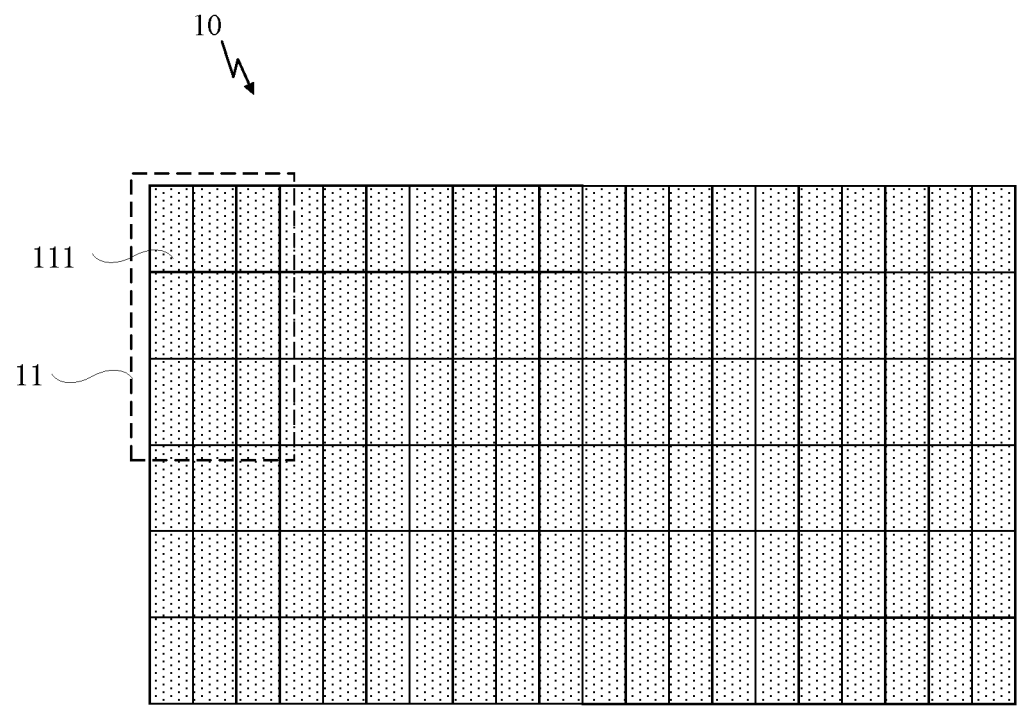
FIG. 4 is a schematic view of the structure of the at least one loading portion in the holographic display device shown in FIG. 3.

On this basis, the obtained hologram is loaded into the pixel units 111 of the spatial light modulator 10 (English abbreviation: SLM) as shown in FIG. 4 through optical addressing or electrical addressing by a computer, so that the obtained hologram can be reproduced in the actual optical path.

Figure 3:
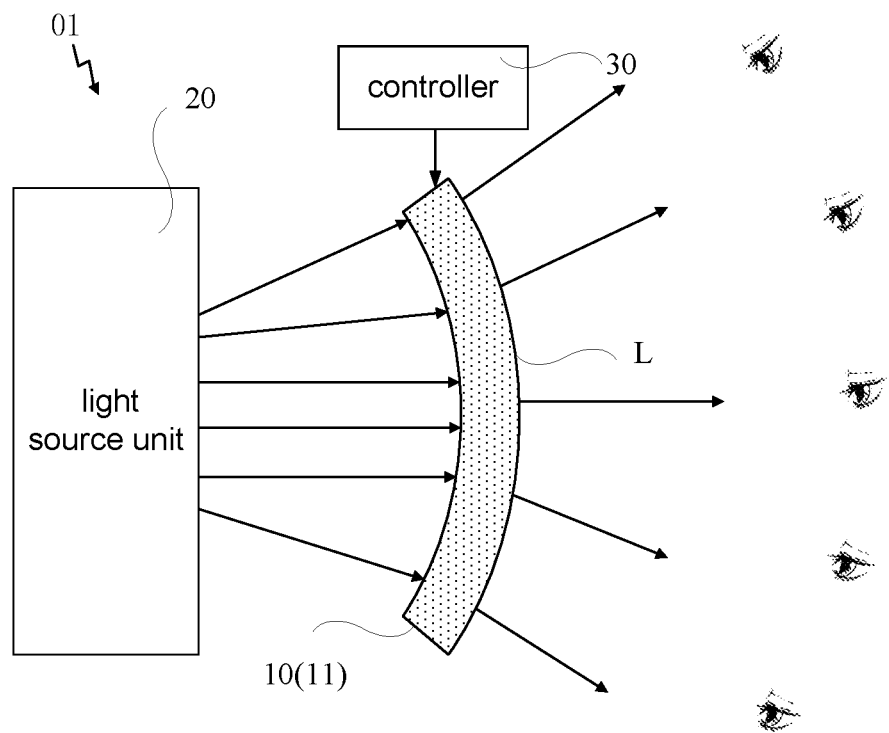
FIG. 3 is a schematic structural view of a holographic display device provided by an embodiment of the present disclosure.

An embodiment of the present disclosure provides a holographic display device 01 as shown in FIG. 3, which includes a spatial light modulator 10.

In some embodiments of the present disclosure, the spatial light modulator 10 may include a liquid crystal spatial light modulator.

Figure 5:
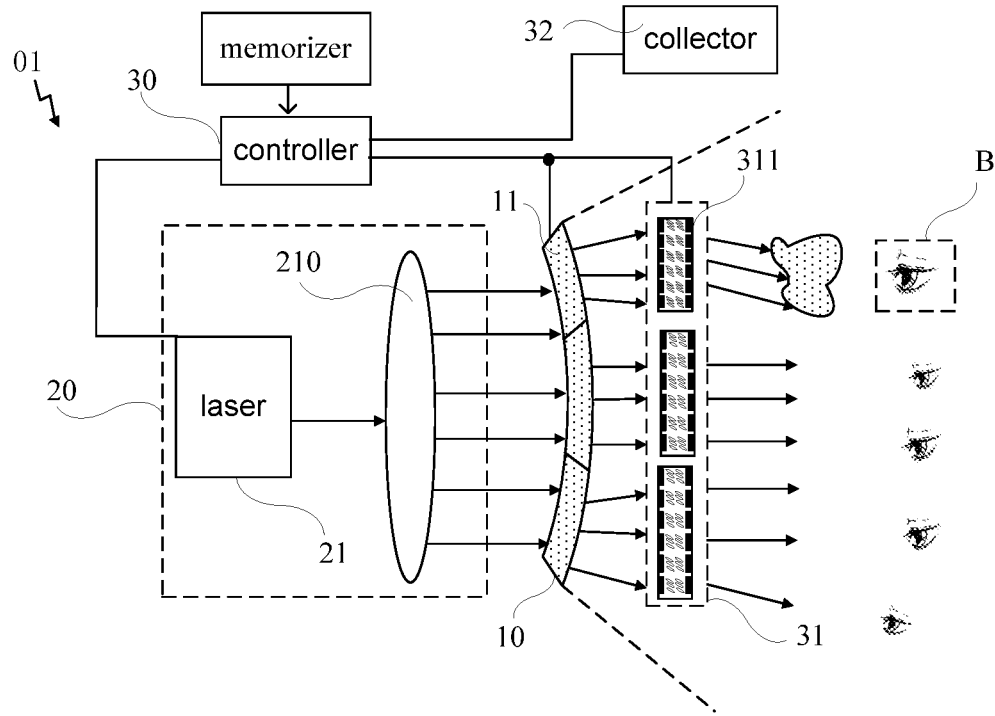
FIG. 5 is a schematic structural view of a holographic display device including a deflecting device provided by an embodiment of the present disclosure.

In some embodiments of the present disclosure, the spatial light modulator 10 includes a loading portion 11 for receiving a write-in signal as shown in FIG. 3, or a plurality of loading portions 11 as shown in FIG. 5.

In some embodiments of the present disclosure, as shown in FIG. 4, the at least one loading portion 11 includes a plurality of pixel units 111 arranged in a matrix form.

Optionally, the light exit surface of at least one loading portion 11 is a first cambered surface L protruding in a direction away from the light source unit 20.

In some embodiments of the present disclosure, in order to reduce the loading time of the hologram, as shown in FIG. 5, the spatial light modulator 10 includes a plurality of loading portions 11. As a result, it is possible to address only the pixel units 111 in one loading portion 11 of the spatial light modulator 10 without addressing all of the pixel units 111 of the spatial light modulator 10, when a frame of hologram is displayed. In this way, the addressing process can be simplified and the amount of data to be calculated can be reduced, so that the loading time of the hologram can be reduced when the holographic display device 01 constituted by the spatial light modulator 10 is used for holographic display.

In some embodiments of the present disclosure, in the case of a plurality of loading portions 11 included in the spatial light modulator 10, it is optional that, as shown in FIG. 5, the light exit surfaces of all the loading portions 11 are the first cambered surface L. Optionally, for easy machining, the curvatures of the first arc surfaces L of all the loading portions 11 are the same.

In some embodiments of the present disclosure, in order to make the read-out light supplied from the light source unit 20 better interfere with the interference fringes loaded on the spatial light modulator 10, It is optional that the light entry surfaces of the spatial light modulator 10 may be a cambered surface having same curvature as the first cambered surface L when the light exit surface of the spatial light modulator 10 is the first arc surface L. In this case, the cross-section of the spatial light modulator 10 is fan-shaped, which is perpendicular to the light-entry surface of the spatial light modulator 10.

In some embodiments of the present disclosure, as shown in FIG. 3, the holographic display device 01 also includes a controller 30 connected to the spatial light modulator 10. And the controller 30 provides a write-in signal and is configured to load holographic data of the hologram into the spatial light modulator 10.

In some embodiments of the present disclosure, the holographic display device 01 further includes a light source unit 20 provided on the light entry side of the spatial light modulator 10 configured to supply the read-out light to the spatial light modulator 10, so that It is possible that the read-out light can diffract with the interference fringes loaded on the spatial light modulator 10 to reproduce the hologram.

In some embodiments of the present disclosure, as shown in FIG. 5, the light source unit 20 may include a laser 21 and a collimating beam expander 210 provided on the light exit side of the laser 21. The collimating beam expander 210 can convert the light emitted from the laser 21 into a collimating surface light source.

Figure 6:
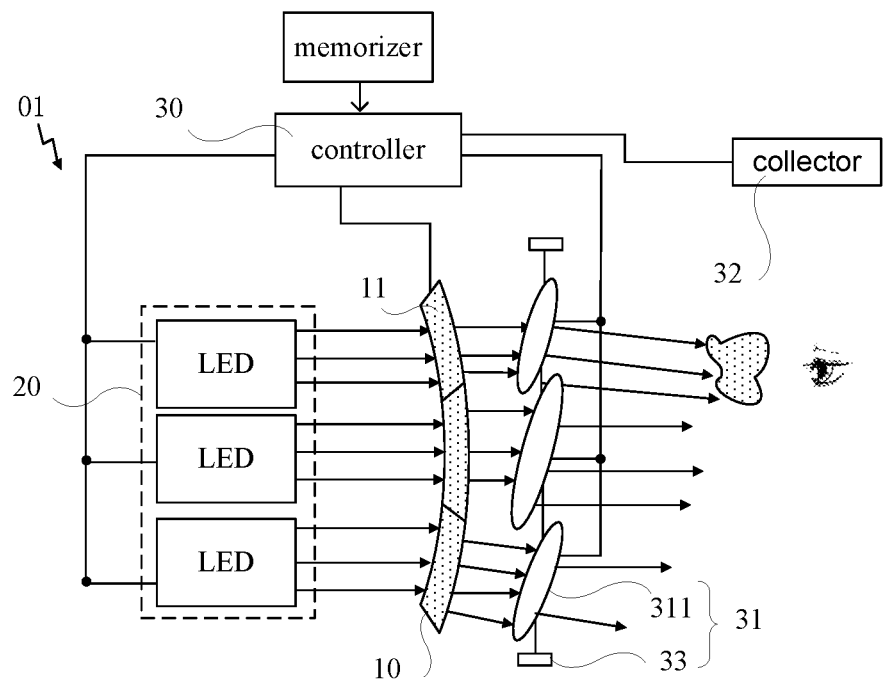
FIG. 6 is a schematic structural view of a holographic display device including another deflecting device provided by an embodiment of the present disclosure.

In some embodiments of the present disclosure, as shown in FIG. 6, the light source unit 20 described above may include at least one LED light source. Optionally, in order to save power consumption, the light source unit 20 includes a plurality of LED light sources corresponding to the at least loading portion 11 respectively. Each of the plurality of LED light sources is connected to the controller 30. Based on this, the LED light sources can be individually controlled by the controller 30. For example, when only one or more loading portions of the at least loading portion 11 are to be addressed, only the LED light sources corresponding to positions of the one or more loading portion 11 to be addressed is turned on, and the remaining light sources of the at least one loading portion are in the closed state, so as to achieve the purpose of reducing power consumption.

In some embodiments of the present disclosure, the light source unit 20 may include 4 a variety of light sources, and the holographic display device 01 may realize color display. Of course, light sources are not limited to color light sources, for example, the LED light sources can emit white light.

Embodiments of the present disclosure provide a holographic display. The spatial light modulator 10 receives the read-out light supplied from the light source unit 20, and the at least one loading portion 11 receives the write-in signal, and the read-out light diffracts with the interference fringes loaded on the spatial light modulator 10 so as to reproduce the hologram. On the basis of this, since the light exit surface of at least a part of at least one loading portion 11 is the first cambered surface L and the first cambered surface L protrudes in a direction away from the light source unit 20, the first cambered surface L can diffuse the output light of the at least a part of loading portion 11 having the first cambered surface L to increase the viewing angle of the holographic display device. And then, when the a lot of people view the holographic image through the holographic display device, the user located near the edge of the at least a part of the at lease one loading portion 11 can see the output light diffused by the first cambered surface L of the loading portion 11, and thus can see the holographic image clearly and completely, In some embodiments of the present disclosure, in order to further increase the viewing angle of the holographic display device 01, as shown in FIG. 7, the light exit surfaces of all the at least one loading surface 11 of the spatial light modulator 10 both are the first cambered surface L, and all of the at least one loading portion are connected end to end successively to form a ring.

Figure 7:
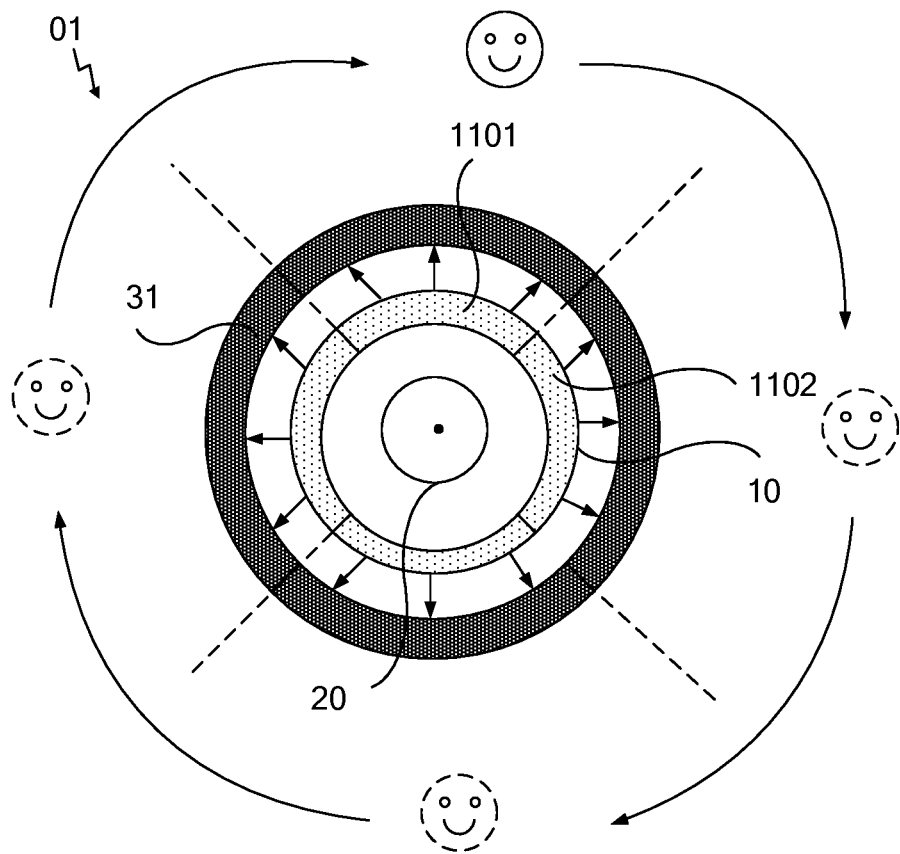
FIG. 7 is a schematic view showing a structure of a ring-like spatial light modulator in the holographic display device of FIG. 3.

It should note that, that all of the at least one loading portion connected end to end successively means that, as shown in FIG. 7, the holographic display device 01 includes a spatial light modulator 10, a plurality of loading portions 11 of which are connected end to end successively to form a ring. In this way, when the hologram display device 01 is used for display, since all of the at least one loading portion 11 of the spatial light modulator 10 are connected end to end successively and to form a ring, the reproduced hologram can be watched on respective sides of the holographic display device 01, so as to improve the viewing experience of the user.

Or, the holographic display device 01 includes a plurality of spatial light modulator 10 connected end to end, each of which is constituted by a loading portion 11 having a first cambered surface L so that the plurality of spatial light modulators 10 is connected end to end successively to form a ring. The benefits of this scheme are the same as those of the scheme shown in FIG. 7, and will not be repeated here.

In some embodiments of the present disclosure, the holographic display device 01 is in the shape of a ring. In order to reduce the manufacturing process of the hologram display device 01, as shown in FIG. 7, it is optional that the light source unit 20 is located in the ring of the spatial light modulator 10. In this way, since the spatial light modulator 10 is of a ring shape and the light source unit 20 is located in the ring of the spatial light modulator 10, a ring shaped light source unit 20 can thus be manufactured, to prevent that a plurality of light source units 20 are provided to supply the read-out light for the at least one loading portion 11, thereby reducing the manufacturing cost of the holographic display device 01. In addition, the controller 30 (not shown in FIG. 7) is located within the ring.

The above-described holographic display device 01 provided by the embodiments of the present disclosure may be applied to, but is not limited to, a showcase in museums, exhibitions and advertisements. For example, when the holographic display device 01 is applied, in a museum, for displaying a restoration image of a cultural relic displayed in a showcase, the user can view the restoration image on any side of the showcase, thereby improving the user watching experience.

When the user is not located at the optimum viewing position of the at least loading portion 11 where he is, the viewing effect for the user on the hologram is poor because the output light of the at least one loading portion 11 is difficult to enter into the eyes of the observer to the greatest extent.

Therefore, in order to improve the viewing effect of the user, it is optional in some embodiments of the present disclosure that, as shown in FIG. 5, the holographic display device 01 further includes a collector 32 for acquiring an observation position, and a deflecting device 31 connected to the collector 32. Specifically, the collector 32 and the deflecting device 31 may be connected via the controller 30. The deflecting device 31 is provided on the light exit side of the spatial light modulator 10 and covers at least a part of at least one loading portion 11. The deflecting device 31 is used for deflecting the output light of the at least a part of at least one loading portion 11 covered by the deflecting device 31 to the observation position.

Optionally, the collector 32 may include a camera that acquires the location of the user's position and the change of eye-gaze, by capturing the position of the user's body, head, eye, or pupil.

A method of controlling the holographic display device provided by the embodiments of the present disclosure includes: acquiring user information which includes a current viewing position of a user; generating a deflection command based on the collected user information for controlling the deflection angle of the deflection device 31 to deflect the output light so as to deflect the formed holographic image to the current observation position of the user.

In some embodiments of the present disclosure, as shown in FIG. 5 or 6, the controller 30 is connected to the collector 32 and the deflecting device 31, wherein the controller 30 receives the acquisition result of the collector 32 and issues a deflection command based on the acquisition result. The deflection command is used to control the deflection angle of the deflecting device 31 to deflect the output light, so as to deflect the formed holographic image to the user's observation position.

In some embodiments of the present disclosure, a user can be determined based on the collected user information. And, the deflection instruction is generated in a situation that the user meets a default condition. For example, a preset condition is provided in the controller 30, which includes at least one of a predetermined location and the user's age range, for example, an age range of 60 to 70 years. When a plurality of users are viewing in the observation area of the at least one loading portion 11, the collector 32 acquires the user's facial features to determine the age of the user and acquires the location of the user. The controller 30 selects the user based on the acquisition result of the collector 32. The controller 30 issues a deflection command when the user satisfies the preset condition, for example, the position of the user B is at the predetermined position or the age of the user B is within the above-mentioned age range. And, the deflection device 31 deflects the output light to the location where the user B is according to the deflection command. That is, the output light of the loading portion 11 is maximally entered into the eyes of the user B, thereby improving the viewing effect of the user.

In some embodiments of the present disclosure, as shown in FIG. 5 or 6, the deflecting means 31 includes at least one light deflecting element 311, which corresponds to at least one the loading portion 11 respectively. In this way, when the users views the hologram image at the different loading portions 11 of the at least one loading portion respectively, at least one light deflection element 311 covering and one-to-one corresponding to the at least one loading portion 11 can deflect the output light of the at least one loading portion 11 according to the acquisition result of the collector 32 so that the output light of the different loading portion of the at least one loading portion 11 is individually controlled.

In some embodiments of the present disclosure, any one of the light deflecting elements 311 is connected to the controller 30. The controller 30 is used for the deflection of the output light of the loading portion 11 corresponding to the position of the light deflecting element 311 to the observation position under the control of the controller 30, so that the output light of the current loading portions can be maximally entered into the eyes of the observer so as to improve the viewing effect of the observer.

In some embodiments of the present disclosure, any of the light deflecting elements 311 may include, as shown in FIG. 5, a liquid crystal grating. Inside the liquid crystal layer, the liquid crystal grating is provided, and block electrodes are arranged on both sides of the liquid crystal layer so as to control the deflection angle of the liquid crystal molecules in the liquid crystal layer by the voltages inputted to the block electrodes. The output direction of the output light of the corresponding loading portion 11 corresponding to the position of the liquid crystal grating is thus controlled.

In some embodiments of the present disclosure, as shown in FIG. 6, the deflecting device 31 includes a bracket 33, and the light deflecting element 311 is a convex lens, at least one deflection direction of which is adjustable, and which is movably mounted on the bracket 33. In this case, the rotation direction of the convex lens can be controlled according to the observation position acquired by the collector 32, and the direction of the output light of the corresponding loading portion of at least one loading portion 11 corresponding to the position of the convex lens can be controlled as necessary.

In some embodiments of the present disclosure, the holographic display device 01 can select the corresponding loading portion of the at least one loading portion 11 for holographic display according to the position and the change of eye-gaze of the user. One or more of the at least one loading portion of the spatial light modulator 10 may be determined as the current loading portions according to the current observation position of the user. And only the light source corresponding to the current loading portion is opened in the light source unit 20 so as to provide the read-out light for the current loading portion. At the same time only the current loading portions receive the write-in signal in the spatial light modulator 10. In this way, the power consumption of the hologram display device 01 can be reduced. And, the current loading portions and the current lightening display area also change with the change of the current observation position of the user. That is, the display area of the holographic display device 01 can be realized so as to track the user's position.

To further understand the concept of the current loading portions, a specific example is given below.

In the case where the spatial light modulator 10 is of the ring shape, the control process of the output light of the loading portion 11 is specifically described in accordance with the change of the observation position of the user, in combination with the deflecting device 31 and the collector 32.

In some embodiments of the present disclosure, in a situation that a user views the reproduced hologram around the holographic display device 01, for example, in the direction of the arrow shown in FIG. 7, e.g. when the user approaches the first loading portion 1101, the collector 32 (not shown) acquires the observation position of the user, and the controller 30 (not shown) opens the light source corresponding to the first loading portion 1101, which provides the first loading portion 1101 with read-out light, based on the observation position of the user acquired by the collector 32. Then the first loading portion 1101 receives the write-in signal and forms a hologram image through the first loading portion 1101 and supplies it to the user. As the user moves within the first loading portion 1101, the controller 30 issues a deflection command based on the acquisition result of the collector 32, according to which the deflecting device 31 deflects the output light so as to deflect the formed holographic image to the user's observation position. When the user moves to the second loading portion 1102, the light source corresponding to the first loading portion 1101 is closed, and at the same time the light source corresponding to the second loading portion 1102 is turned on. The second loading portion 1102 starts to display. In addition, when the user moves to another loading portion, the control process of the holographic display device 01 is the same as described above, and will not be described here. In this way, the display area of the spatial light modulator 10 in accordance with the movement of the viewer is realized.

Figure 8:
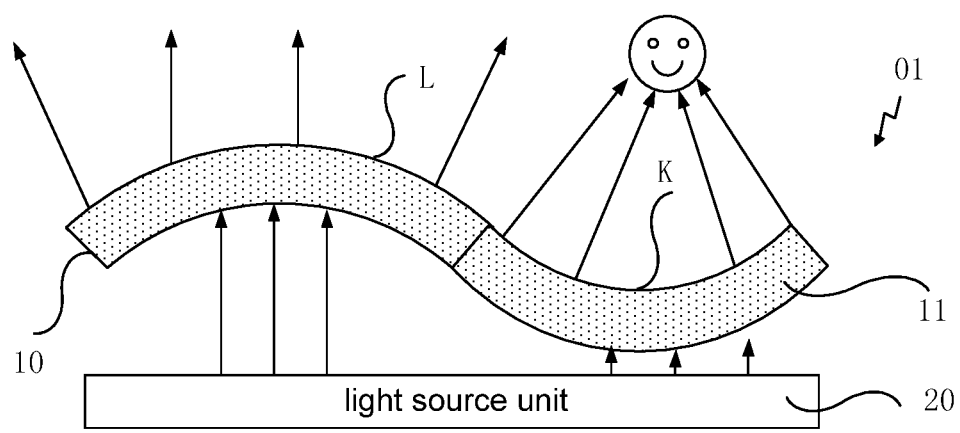
FIG. 8 is a schematic structural view of a spatial light modulator in the holographic display device of FIG. 3.

In some embodiments of the present disclosure, in the practical application of the holographic display device 01, in order to improve the viewing effect of the hologram display device 01, as shown in FIG. 8, in a situation that at least one loading portion of the spatial light modulator 10 includes at least two loading portions 11, the light exit surface of a part of at least two loading portions 11 is the second cambered surface K, and the second cambered surface K is protruded in the direction towards the light source unit 20. The first cambered surface L and the second cambered surface K are located at different loading portions 11 of the at least two loading portions. In this case, since the second cambered surface K protrudes in the direction towards the light source unit 20, the second cambered surface K can converge the output light of the part of the at least two loading portion 11 together so that the viewing effect is better when the user is located at a position at which the output light is converged.

A embodiment of the present disclosure also provides a computer non-transient readable storage medium storing instructions that, when running by a processor, cause the processor to perform the control method described above.

The present disclosure also provides a computer program product comprising instructions that, when run on a computer, cause a computer to execute the control method described above.

The steps of the method or algorithm described in embodiments of the present disclosure may be implemented in hardware, or may be implemented by a processor executing software instructions. Software instructions can be made up of the corresponding software modules, which can be stored in random access memory (RAM), flash memory, read only memory (ROM), erasable programmable read-only memory (EPROM), electrically erasable programmable read-only memory (EEPROM), registers, hard disks, removable hard disks, read-only optical disks (CD-ROMs), or any other form of storage media well known in the art. An exemplary storage medium is coupled to the processor so that the processor can read information from the storage medium and can write information to the storage medium. The processor may be a device such as a central processing unit (CPU), a field programmable logic array (FPGA), a microcontroller (MCU), a specific functional application circuit (ASIC), and the like having logical computing capability and/or program execution capability.

Those skilled in the art will appreciate that in one or more of the above examples, the functions described herein may be implemented in hardware, software, firmware, or any combination thereof. When implemented using software, these functions may be stored in a computer-readable medium, or transmitted as one or more instructions (or code) on a computer-readable medium. The computer-readable medium includes a computer storage medium and a communication medium. The communication medium includes any medium that facilitates transferring a computer program from one place to another. The storage medium may be any available media that can be accessed by a universal or special purpose computer.

The foregoing descriptions are merely specific implementation manners of the disclosure, rather than limiting the protection scope of the application. Any change or substitution that is readily conceived for any one skilled in the art within the technical scope disclosed by the disclosure shall fall into the protection scope of the application. Therefore, the protection scope of the present disclosure shall be defined by the claims.

Additional embodiments including any one of the embodiments described above may be provided by the disclosure, where one or more of its components, functionalities or structures is interchanged with, replaced by or augmented by one or more of the components, functionalities or structures of a different embodiment described above.

In some embodiments of the present disclosure, communications may be made directly or indirectly over a network connection when communicating data, information, and the like. For example, a network may include any combination of a wireless network, a wired network, and/or a wireless network and a wired network. A network may include a LAN (local area network), an Internet, a telecommunications network, an Internet of things based on the Internet and/or telecommunications network, and/or any combination of the above network. A wired network can communicate using a transmission mode such as twisted pairs, coaxial cables, or optical fiber. A wireless network may use a communication mode such as a 3G/4G/5G mobile communication network, a Bluetooth, a Zigbee, or a WiFi.

What is claimed is:

1. A holographic display device, comprising a spatial light modulator and a light source unit provided on a light entry side of the spatial light modulator and configured to provide read-out light to the spatial light modulator, wherein, the spatial light modulator comprises at least one loading portion configured to receive a write-in signal, which comprises a plurality of pixel units arranged in a matrix form, and a light exit surface of at least a part of which is a first cambered surface protruding in a direction away from the light source unit;

the holographic display device further comprises a collector configured to acquire an observation position, and a deflecting device, which is connected to the collector, and the deflecting device is provided on a light exit side of the spatial light modulator, covers at least a part of the at least one loading portion, and is configured to deflect the output light of the part of the at least one loading portion covered by the deflecting device to the observation position.

2. The holographic display device according to claim 1, wherein, the deflecting device comprises at least one light deflecting element, and there is one-to-one correspondence between the at least one light deflecting element and the at least one loading portion.

3. The holographic display device according to claim 2, wherein, the at least one light deflecting element comprises a liquid crystal grating.

4. The holographic display device according to claim 2, wherein, the deflecting device further comprises a bracket, and the light deflecting element comprises a convex lens, at least one deflection direction of which is adjustable, and which is movably mounted on the bracket.

5. The holographic display device according to claim 1, wherein, the at least one loading portion comprises at least two loading portions, the light exit surface of a part of the at least two loading portions is a second cambered surface protruding in a direction close to the light source unit, and the first cambered surface and the second cambered surface are located at different loading portions of the at least two loading portions.

6. The holographic display device according to claim 1, wherein, light exit surfaces of all of at least one loading portions of the spatial light modulator are the first cambered surface, and all of the at least one loading portion are connected end to end successively to form a ring.

7. The holographic display device according to claim 6, wherein, the light source unit is located within the ring in the spatial light modulator.

8. The holographic display device according to claim 1, wherein, the light source unit comprises a laser and a collimating beam expander disposed in turn on the light entry side of the spatial light modulator, the collimating beam expander being configured to convert the light emitted from the laser into a surface light source.

9. The holographic display device according to claim 1, wherein, the light source unit comprises at least one LED light source.

10. The holographic display device according to claim 1, wherein, the holographic display device further comprises: a controller connected to the spatial light modulator and configured to load holographic data of one frame of a hologram to the spatial light modulator, and wherein, the light source unit comprises at least one light source, and there is one-to-one correspondence between the at least one light source and the at least one loading portion, and each of the at least one light source is connected to the controller which is configured to:

in a situation that one or more loading portions of the at least one loading portion are addressed, open the light sources corresponding to positions of the one or more loading portions to be addressed in the light source unit, and close the remaining light sources in the light source unit.

11. A control method of controlling the holographic display device according to claim 10, wherein, the control method comprises:

acquiring user information which includes a current viewing position of a user;

generating a deflection command based on the collected user information, the deflection command being configured to control a deflection angle of the deflection device in order to deflect output light so as to deflect a formed holographic image to the current observation position of the user.

12. The control method according to claim 11, wherein, the step of generating a deflection command based on the collected user information includes:

determining a user based on the user information, and generating the deflection command in a situation that the user meets a default condition.

13. The control method according to claim 12, wherein, the user information comprises a facial feature of the user, and the default condition comprises at least one of a predetermined location and the user's age range.

14. The control method according to claim 12, wherein, the method further comprises:

determining one or more of the at least one loading portion of the spatial light modulator as current loading portions according to the current observation position of the user;

opening only the light source corresponding to the current loading portions in the light source unit, so as to provide the read-out light for the current loading portions;

making only the current loading portions in the spatial light modulator to receive a write-in signal.

15. A computer non-transient readable storage medium storing computer instructions configured to, when executed by a processor, cause the processor to perform the control method of claim 11.

16. A computer program product comprising instructions that, when running on a computer, cause the computer to execute the control method of claim 11.

* * * * *